(12) United States Patent
Hertzberg (10) Patent No.: US 7,397,629 B1
(45) Date of Patent: Jul. 8, 2008

(54) SYSTEMS AND METHODS FOR REGULATING HARD DISK DRIVE OPERATION IN COLD TEMPERATURES

(75) Inventor: Marc Hertzberg, Sudbury, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/542,748

(22) Filed: Oct. 3, 2006

Related U.S. Application Data (60) Provisional application No. 60/723,109, filed on Oct. 3, 2005.

(51) Int. Cl.
*G11B 5/596* (2006.01)
*G11B 21/02* (2006.01)

(52) U.S. Cl. .................................... 360/78.04; 360/75

(58) Field of Classification Search .................. None
See application file for complete search history.

(56) References Cited

U.S. PATENT DOCUMENTS

| | | | | | |
|---|---|---|---|---|---|
| 5,128,813 | A | * | 7/1992 | Lee | 360/78.07 |
| 5,204,593 | A | * | 4/1993 | Ueki | 318/254 |
| 5,381,279 | A | * | 1/1995 | Dunn | 360/70 |
| 5,457,365 | A | * | 10/1995 | Blagaila et al. | 318/430 |
| 5,473,238 | A | * | 12/1995 | Latham et al. | 318/560 |
| 6,055,120 | A | * | 4/2000 | Schirle | 360/73.03 |
| 6,078,455 | A | * | 6/2000 | Enarson et al. | 360/68 |
| 6,188,191 | B1 | * | 2/2001 | Frees et al. | 318/560 |
| 6,266,203 | B1 | * | 7/2001 | Street et al. | 360/69 |
| 7,035,031 | B2 | * | 4/2006 | Kim et al. | 360/69 |

* cited by examiner

*Primary Examiner*—K. Wong
(74) *Attorney, Agent, or Firm*—Myers Bigel Sibley & Sajovec, P.A.

(57) ABSTRACT

A cold seek governor process for a hard disk drive includes regulating delay between seek operations when temperature of the disk drive is below a threshold temperature.

37 Claims, 5 Drawing Sheets

SYSTEMS AND METHODS FOR REGULATING HARD DISK DRIVE OPERATION IN COLD TEMPERATURES

RELATED APPLICATIONS

Priority is claimed from U.S. Provisional Patent Application Ser. No. 60/723,109 filed on Oct. 3, 2005, which is incorporated by reference in its entirety.

FIELD OF THE INVENTION

The present invention relates to hard disk drives and, more particularly, to hard disk drives optimized for use in cold temperature environments.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

Figure 1:
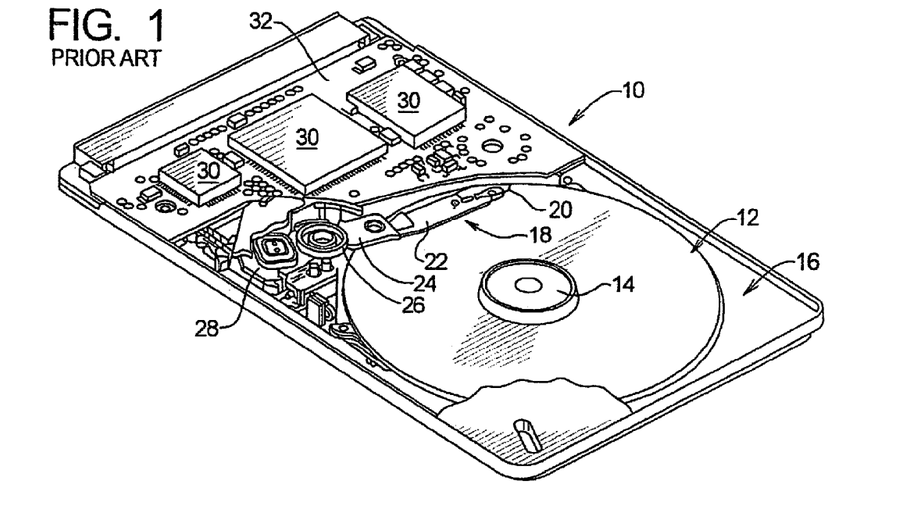
FIG. 1 is a perspective view of a conventional hard disk drive system.

A conventional hard disk drive (HDD) system, generally designated 10, is illustrated in FIG. 1. The HDD system 10 comprises a data storage disk 12 that is rotated by a spindle motor 14. The spindle motor 14 is mounted to a base plate 16.

The HDD system 10 also includes a drive arm assembly 18, which includes a transducer 20 mounted to a flexure arm 22. As is conventional, the transducer 20 comprises both a write head and a read head. The drive arm assembly 18 is attached to an actuator arm 24 that can rotate about a bearing assembly 26. A drive voice coil motor (VCM) 28 cooperates with the actuator arm 24 and, hence, the drive arm assembly 18, to move the transducer 20 relative to the disk 12.

The spindle motor 14, voice coil motor 28, and transducer 20 are coupled to a number of electronic circuits 30. As will be described in further detail below, the electronic circuits 30 typically include a read channel chip, a microprocessor-based controller (or combination), a random access memory (RAM) device, and associated signal drive and logic circuitry.

The disk drive system 10 typically includes a plurality of disks 12 and, therefore, a plurality of corresponding actuator arm assemblies 18. However, it is also possible for the disk drive system 10 to include a single disk 12 as shown in FIG. 1. Typically, one drive arm assembly 18 is provided for each surface of each disk 12.

Figure 2:
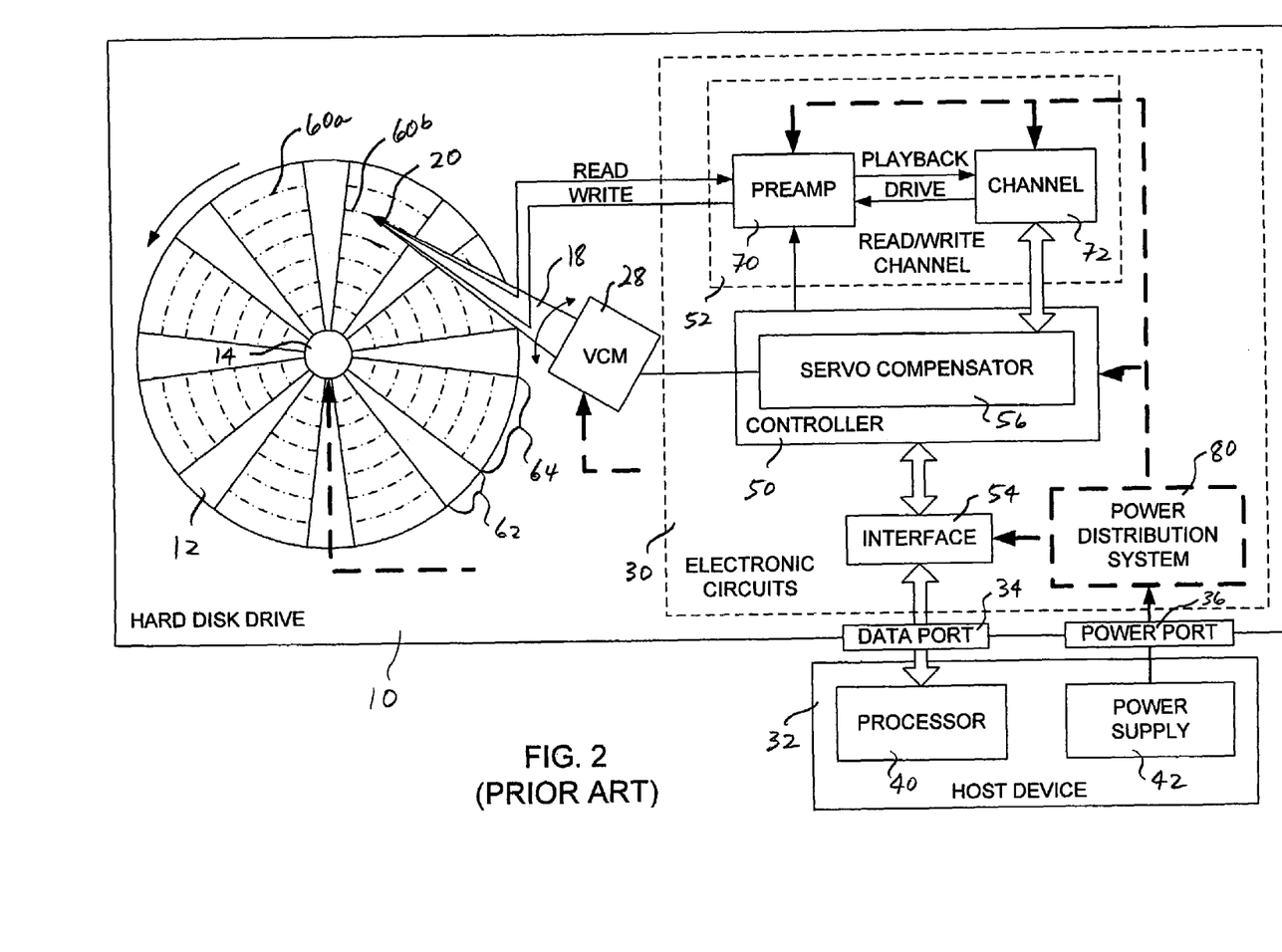
FIG. 2 is a simplified block diagram of a conventional hard disk drive system.

FIG. 2 is a functional block diagram which illustrates a conventional disk drive such as that depicted at 10 in FIG. 1. The example hard disk drive system 10 is coupled to a host device 32 via an input/output port 34 and a power port 36. The host device 32 comprises a processor 40 and a power supply 42. The host device 32 may take many forms, including a general purpose computing device, a media player, a cellular telephone, and a digital camera or camcorder.

Data is transferred between the hard disk drive system 10 and the processor 40 of the host device 32 through the input/output port 34, and power is supplied by the power supply 42 of the host device 32 to the drive system 10 through the power port 36. The details of construction and operation of the host device 32, the input/output port 34, and the power port 36 are or may be conventional and will not be described herein beyond the extent necessary for a complete understanding of the present invention.

For a variety of reasons, the power supplied to the hard disk drive 10 through the power port 36 may be limited. As one example, the power supply 42 may comprise a power storage device, such as a battery, which has limited power storage capacity. As another example, the power may be transferred between the host device 32 and the power port 36 using a transmission system, such as a USB system, that has limited power transmission capacity, or by system specification limits.

In addition to the components of the disk drive system 10 shown and labeled in FIG. 1, FIG. 2 illustrates (in block diagram form) that the electronic circuits 30 comprise a drive controller 50, a read/write channel 52, and an interface 54. The drive controller 50 comprises a servo compensator 56. Except as noted below, the details of construction and operation of the drive controller 50, the read/write channel 52, the interface 54, and the servo compensator 56 also are or may be conventional and will not be described herein in further detail.

The disk drive system 10 is used by the host device 32 as a data storage device. The host device 32 delivers data access requests to the disk drive system 10 via the input/output port 34. The data port 34 is used to transfer data between the disk drive system 10 and the host device 32 during read and write operations.

The drive arm assembly 18 is a semi-rigid member that acts as a support structure for the transducer 20, holding it above the surface of the disk 12. The drive arm assembly 18 is coupled at one end to the transducer 20 and at another end to the drive VCM 28. The drive VCM 28 is operative for imparting controlled motion to the actuator arm 18 to appropriately position the transducer 20 with respect to the disk 12. The drive VCM 28 operates in response to a control signal generated by the servo compensator 56 of the drive controller 50. The servo compensator 56 generates the control signal in response to, among other things, an access command received from the host device 32 via the interface 54.

The read/write channel 52 is operative for appropriately processing the data being read from/written to the disk 12. For example, during a read operation, the read/write channel 52 converts an analog read signal generated by the transducer 20 into a digital data signal that can be recognized by the drive controller 50. The channel 52 is also generally capable of recovering timing information from the analog read signal.

During a write operation, the read/write channel 52 converts data received from the host device 32 into a write current signal that is delivered to the transducer 20 to "write" the data to an appropriate portion of the disk 12. The read/write channel 52 is also operative for continually processing data read from servo information stored on the disk 12 and delivering the processed data to the drive controller 50 for use in, for example, transducer positioning.

Referring now more specifically to the hard disk 12, as depicted in FIG. 2 the spindle motor 14 is operatively connected to the disk 12 such that the motor 14 rotates the disk 12 relative to the transducer 20. As the spindle motor 14 rotates the disk 12, the transducer 20 stores data on the disk 12 in substantially concentric data storage tracks 60 on a surface of the disk 12. The example data storage disk 12 also includes servo information in the form of a plurality of radially-aligned servo spokes 62 that each cross all of the tracks 60 on the disk 12. The portions of the track between the servo spokes 62 have traditionally been used to store data received from, for example, the host device 32 and are thus referred to herein as data regions 64.

In a magnetic disk drive system 10, data is stored, for example, in the form of magnetic polarity transitions within each track 60. Data is "read" from the disk 12 by positioning the transducer 20 (i.e., the read head) above a desired track 60 of the disk 12 and sensing the magnetic polarity transitions stored within the track 60 as the disk 12 moves below the transducer 20. Similarly, data is "written" to the disk 12 by positioning the transducer 20 (i.e., the write head) above a desired track 60 and delivering a write current representative of the desired data to the transducer 20 at an appropriate time.

The data storage tracks 60 are illustrated as center lines on the surface of the disk 12; however, it should be understood that the actual tracks will each occupy a finite width about a corresponding centerline. It should be understood that, for ease of illustration, only a small number of tracks 60 and servo spokes 62 have been shown on the surface of the disk 12 of FIG. 3. That is, conventional disk drives include one or more disk surfaces having a considerably larger number of tracks and servo spokes.

The servo information in the servo spokes 62 is a specialized form of data stored on the disk 12 that is read by the transducer 20 during disk drive operation for use in positioning the transducer 20 above a desired track 60 of the disk 12. In particular, the disk drive system 10 operates in at least two positioning modes: seek and track following. During the seek mode, the system 10 moves the transducer 20 from an initial track 60a to a target track 60b. During the track following mode, the system 10 maintains the transducer 20 above the desired track 60 while data is read from or written to the disk 12.

The servo information is configured to allow the system 10 to operate in both the seek and track following modes. As is well-known in the art, the servo information stored in the servo spokes allows the servo compensator 56 to determine a position of the transducer 20 relative to the disk 12. The servo compensator 56 uses the position information during seek and track following modes to move to and/or follow the target track 60b.

Referring back for a moment to FIG. 2, it can be seen that the read/write channel comprises a preamplifier circuit 70 and a channel circuit 72. The preamplifier circuit 70 performs two functions. First, the preamplifier circuit 70 generates a write signal for driving the write head portion of the transducer 20 based on an analog differential drive signal generated by the channel circuit 72. Second, the preamplifier 70 generates an analog playback signal 72 based on a read signal generated by the read head portion of the transducer 20. The playback signal is delivered to the channel circuit 72.

The channel circuit 72 also performs two basic functions. First, the channel circuit 72 generates the analog differential drive signal based on the digital data to be written to the disk 12. Second, the channel circuit 72 converts the analog playback signal into digital data that can be processed by the drive controller 50 and/or host device 32. The details of construction and operation of the preamplifier 70 and the channel circuit 72 are or may be conventional and will not be described herein in further detail.

As generally described above, power is supplied to the hard disk drive system 10 through the power port 36. A power distribution system 80 for transmitting this power to the various electrical components of the hard disk drive system 10 is represented by bold dashed lines in FIG. 2. In addition to wiring, the power distribution system 80 may comprise circuitry for regulating the power signal obtained through the power port 36 as appropriate for each of the components of the electronic circuits 30. The example power distribution system 80 is or may be conventional and will not be described herein beyond the extent necessary for a complete understanding of the present invention.

As generally discussed above, power supplied to the hard disk drive 10 through the power port 36 may be limited, in storage capacity and/or in transmission capacity or by system specification. The electronics 30 include fully differential buffer (FDB) and complementary metal oxide semiconductor (CMOS) electronics that consume more power at relatively cold temperatures than at relatively high temperatures. Accordingly, the power consumption associated with aggressive seek operations, which are typically performed by circuits using FDB and CMOS electronics and external transistors, increases power consumption of the hard disk drive system 10. Typically the power consumption of seek operations increases as seek operations are made more aggressive.

In some cold temperature situations, the power consumption of the disk drive system 10 due to electronics and aggressive seek operations may exceed the maximum system power specifications. It is undesirable that a disk drive system exceed maximum system power specifications because these power specifications are designed based on the limitations of the power supplied to the hard disk drive system by the host device.

Accordingly, the need thus exists for hard disk drive systems and methods that limit power consumption in cold environments to ensure that the hard disk drive system design can be properly configured for the environment, power needs, usage patterns, and reliability of a particular host device.

SUMMARY OF THE INVENTION

The present invention may be embodied as a cold seek governor process for a hard disk drive comprising the following steps. A threshold temperature is predetermined. The temperature associated with the hard disk drive is sensed. Operation of the hard disk drive is altered when the drive temperature is below the threshold temperature.

The present invention may also be embodied as a controller for a hard disk drive comprising a temperature sensor and a cold seek governor. The temperature sensor senses the drive temperature associated with the hard disk drive. The cold seek governor alters operation of the hard disk drive when the drive temperature is below a predetermined threshold temperature.

DETAILED DESCRIPTION

Figure 3:
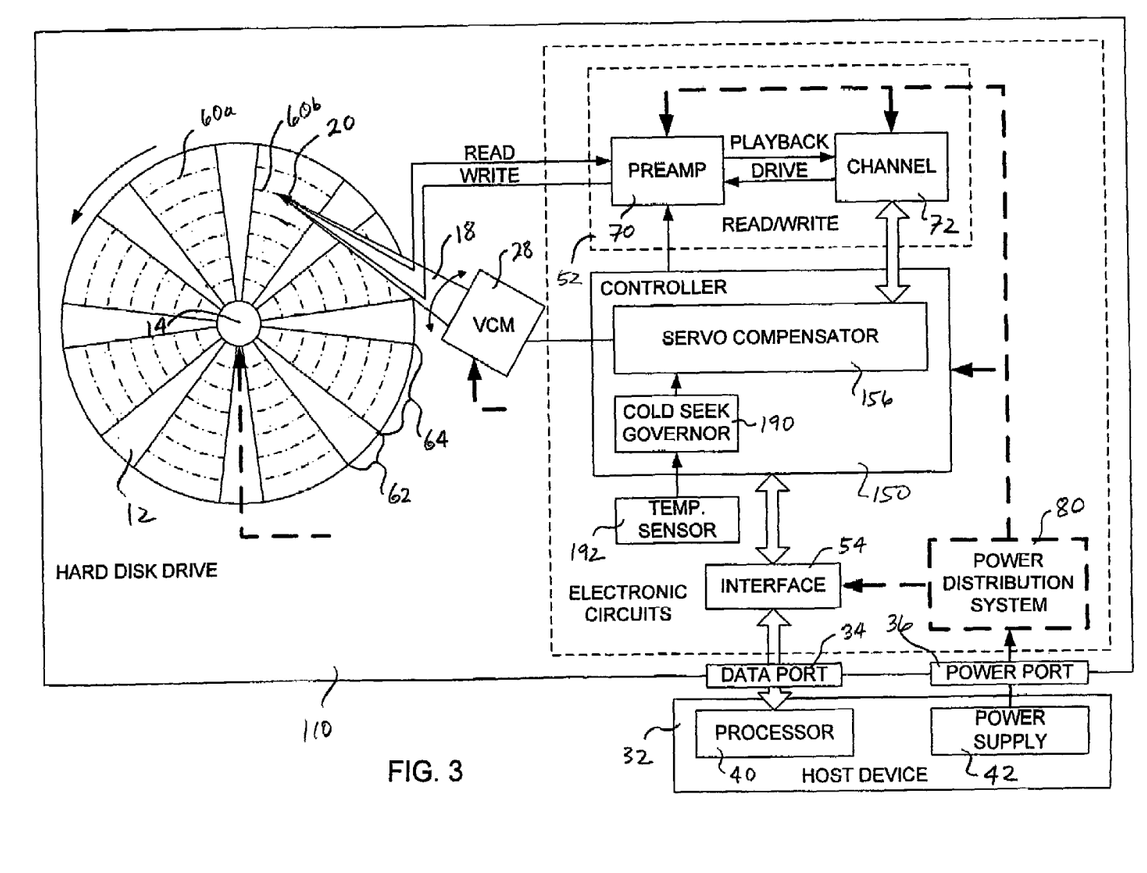
FIG. 3 is a simplified block diagram of a hard disk drive system comprising a cold seek governor system of the present invention.

Referring now to FIG. 3 of the drawing, depicted therein is a disk drive system 110 constructed in accordance, and embodying the principles of the present invention. Except as noted below, the disk drive system 110 is or may be constructed in the same manner as the conventional hard disk drive system 10 described above. Components of the disk drive system 110 of the present invention as depicted in FIG. 3 that are or may be the same as the components of the disk drive system 10 depicted in FIG. 2 are identified with the same reference characters used in FIG. 2. Components that are common between the hard disk drive systems 10 an 110 and will not be described again below beyond what is necessary for a complete understanding of the present invention.

The disk drive system 110 comprise electronic circuits 130 that differ from the electronic circuits 30 described above in that the controller 150 is provided with a cold seek governor 190. The cold seek governor 190 is operatively connected to a temperature sensor 192 and to a servo compensator 156 forming part of the controller 150. The seek governor 190 may be implemented in hardware, in servo firmware running a processor of the controller 150, or in software running on a processor elsewhere in the hard disk drive 110.

Based on a drive temperature as sensed by the temperature sensor 192, the example cold seek governor 190 modifies the servo compensator 156 to limit power consumption under predefined cold temperature conditions. Accordingly, in environments where the temperature is low and the hard disk drive 110 should not draw power outside of a predetermined acceptable power consumption range, the servo compensator 156 is altered such that the power consumption of the drive 110 is maintained within the acceptable power consumption range. For example, the servo compensator 156 may be altered to perform seek operations by controlling the permissible repetition duty cycle of seeking to minimize power consumption. The cold seek governor 190 may be configured to modify or otherwise alter components of the hard disk drive in addition or instead of the servo compensator 156 to limit power consumption under the cold temperature conditions.

The predefined cold temperature conditions will typically include a threshold temperature above which the cold seek governor 190 does not alteration of the drive 110. The threshold may take the form of a value corresponding to a temperature above which cold seek delay is not implemented and below which cold seek delay is implemented. As another alternative, the cold temperature conditions may be defined by an equation defining a linear or non-linear temperature curve.

For example, such a curve may be defined by the equation y=mx+b, where y is the "delay," x is "temperature," and "m" and "b" are constants. If "b" is −40 and "m" is 1, then "y" is zero when "x" is 40. Therefore, if "x" is less than 40, seek delay is determined by some value, proportional or binary. If "x" is greater than 40, the drive 110 does not delay seek operations. As another example, the temperature curve may be an exponential starting at a predetermined "y" value and approaching "y" equals zero. Given a value of "x," y is the delay. In this case, the seek delay defined by the curve does not define an absolute threshold, but is simply inconsequential at certain temperatures.

As the drive temperature increases under the predefined cold temperature conditions, the seek governor 190 may alter the parameters of the servo compensator 156 to allow increased power consumption. And when the seek governor 190 determines that the hard disk drive system 110 is no longer operating under the predefined cold temperature conditions, the seek governor 190 may alter the servo compensator 156 to allow normal operation of the hard disk drive system 110.

Figure 4:
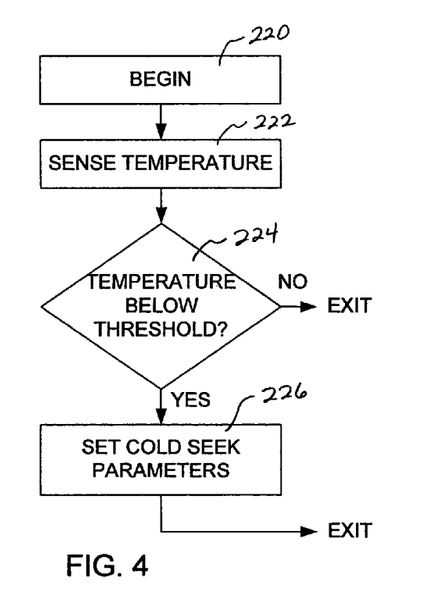
FIG. 4 is a flow chart depicting a first example implementation of a cold seek governor process of the present invention.

Referring now to FIG. 4 of the drawing, depicted therein is a first example seek governor process. The hard disk drive 110 normally operates in a performance mode in which performance thereof is optimized. When the example seek governor process is running, the hard disk drive 110 operates in a power reduction mode in which power consumption of the hard disk drive is reduced. In the example seek governor process depicted in FIG. 4, the cold temperature conditions are defined as any temperature within a range defined at an upper end by a cold temperature threshold.

The seek governor process begins at a step 220. At a step 222, the process senses the drive temperature. At a step 224, the process determines whether the drive temperature is below the temperature threshold. If the drive temperature is not below the temperature threshold, the process 220 exits to allow normal drive operation, including seek operation.

If, however, the drive temperature is below the temperature threshold, the process proceeds to step 226 at which the process determines cold seek parameters. In the example system 110, the cold seek parameters such as minimum time between seek starts, are transferred to other components of the hard disk drive 110, typically the servo compensator 156, to cause the hard disk drive 110 to conserve power.

Figure 5:
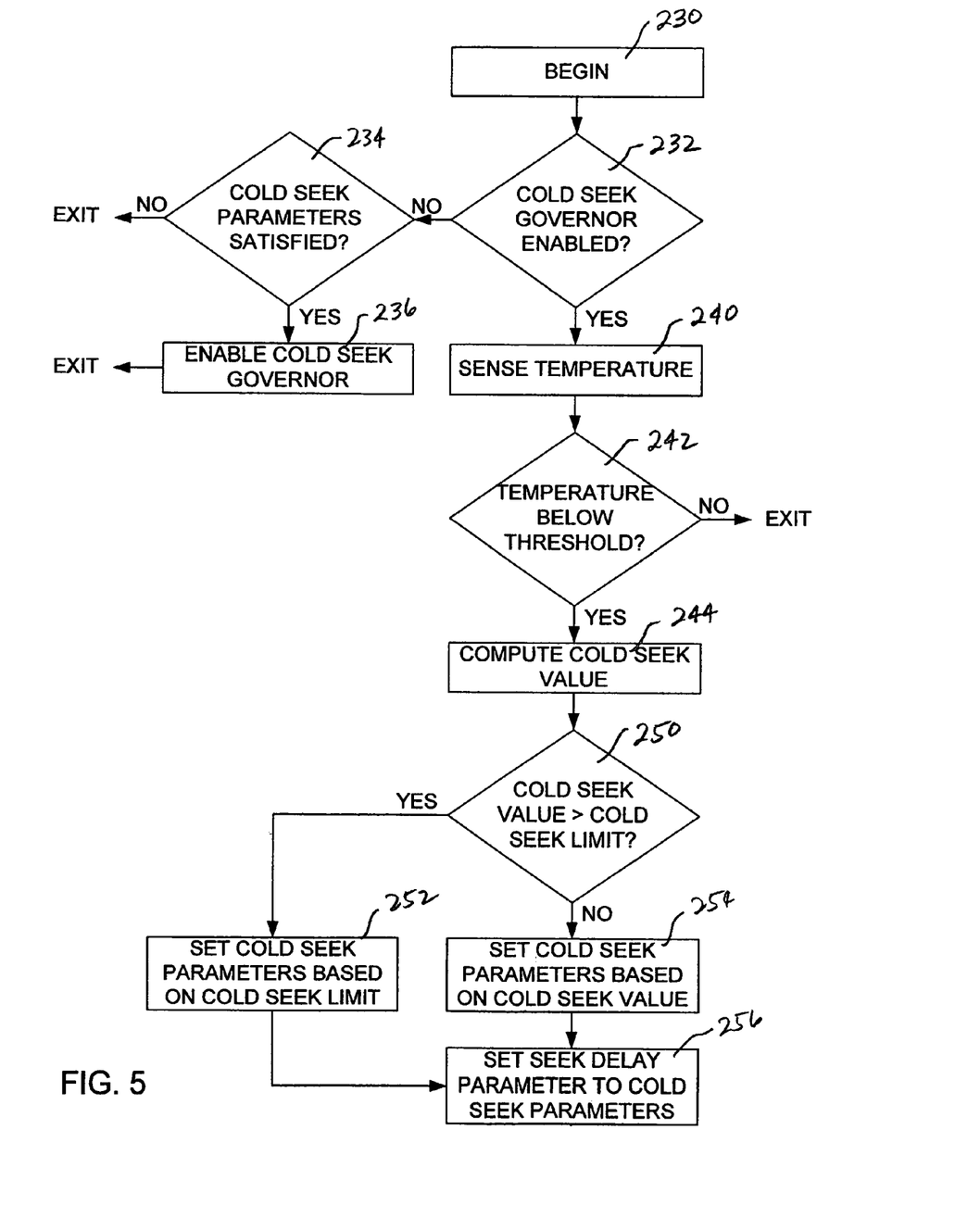
FIG. 5 is a flow chart depicting a second example implementation of a cold seek governor process of the present invention.

Referring now to FIG. 5, depicted therein is another example seek governor process that may be implemented by the hard disk drive 110. The process depicted in FIG. 5 begins at a step 230. The process then proceeds to step 232, which determines whether the cold seek governor is enabled. If not, the process proceeds to step 234, which determines whether the cold seek parameters have been satisfied. In the example process depicted in FIG. 5, the cold seek parameters take the form of a delay, and step 234 determines whether the delay time has elapsed. If not, the process exits to allow other drive processes to measure the delay before seeking. Eventually, and after reentering the process depicted in FIG. 5, the delay time elapses, and the process proceeds from step 234 to step 236 at which the cold seek governor is enabled.

The process then returns to step 230 and then to step 232. This time, however, step 232 determines that the cold seek governor is enabled. The process then proceeds to step 240, at which point the process senses the drive temperature. The process then proceeds to step 242, at which point the process determines whether the temperature is below the threshold temperature. If not, the process exits to allow seek delay to continue.

If step 242 determines that the temperature is below the threshold temperature, the process proceeds to step 244 and computes a cold seek value. The process then proceeds to step 250, where the process determines whether the cold seek value computed at step 244 is greater than a cold seek delay limit. If so, the process proceeds to step 252 where the cold seek parameters are set based on the cold seek limit. If not, the process proceeds to step 254, where the cold seek parameters are set based on the cold seek value.

After the cold seek parameters have been set at step 252 or 254, the process exits and the minimum delay between seeks will be based on the new cold seek parameters at step 256 and then exits. In the example hard disk drive system 110, the cold seek parameters are transferred to the servo compensator 156 at step 256 and then the process exits.

Figure 6:
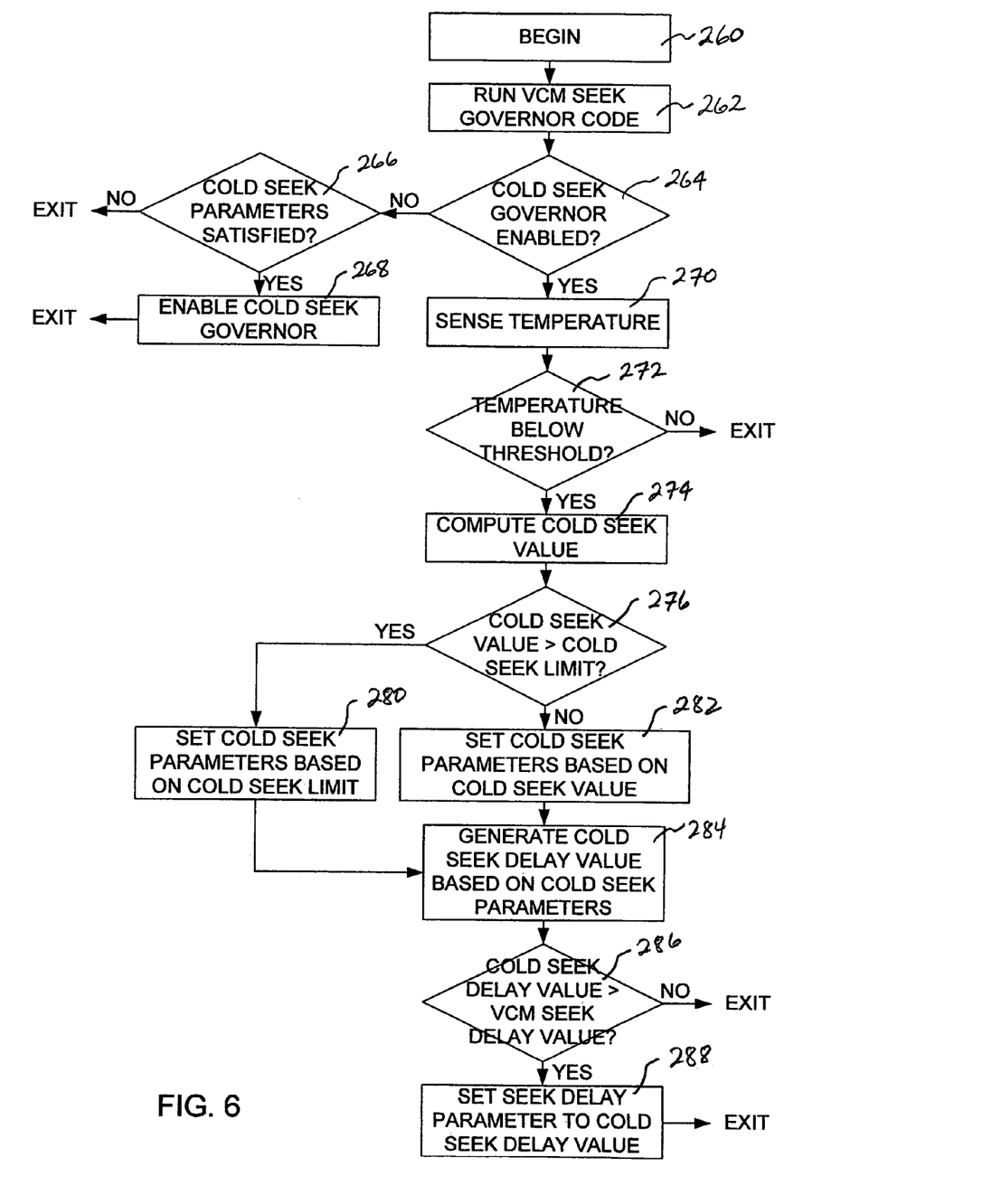
FIG. 6 is a flow chart depicting a third example implementation of a cold seek governor process of the present invention.

Referring now to FIG. 6 of the drawing, another example cold seek governor process will be described. The process depicted in FIG. 6 is adapted to work with another seek governor, in this example a seek governor that prevents the VCM 28 from failing at high temperatures. In the example process depicted in FIG. 6, the cold seek governor shares a spoke delay counter with the VCM hot seek governor.

The process begins at step 260 and proceeds to step 262 where the VCM hot seek govern process is run. The process then proceeds to step 264, which determines whether the cold seek governor is enabled. If not, the process proceeds to step 266, which determines whether the minimum seek delay has been satisfied. In the example process depicted in FIG. 5, the seek parameters take the form of a delay, and step 236 determines whether the delay time has elapsed. If not, the process exits to allow external timing of the delay time. Eventually, the delay time elapses, and the process proceeds from step 266 to step 268 at which the cold seek governor is enabled.

When the process then returns to step 260 and then to steps 262 and 264. This time, however, step 264 determines that the cold seek governor is enabled. The process then proceeds to step 270, at which point the process senses the drive temperature. The process then proceeds to step 272, at which point the process determines whether the temperature is below the threshold temperature. If not, the process exits.

If step 272 determines that the temperature is below the threshold temperature, the process proceeds to step 274 and computes a cold seek value. The process then proceeds to step 276, where the process determines whether the cold seek value computed at step 274 is greater than a cold seek delay limit. If so, the process proceeds to step 280 where the cold seek parameters are set based on the cold seek limit. If not, the process proceeds to step 282, where the cold seek parameters are set based on the cold seek value.

After the cold seek parameters have been set at step 280 or 282, the process proceeds to step 284, at which a cold seek delay value is generated based on the cold seek parameters. The process then proceeds to step 286, which determines whether the cold seek delay value is greater than any VCM hot seek delay value set at step 262. If the VCM seek delay value is greater than the cold seek delay value, the longer VCM seek delay value is set instead of the cold seek delay value, and the process exits.

If the cold seek delay value is greater than any VCM seek delay value set at step 262, the process then proceeds to step 288, where the cold seek delay value is transferred to the servo compensator 156. In this case, the longer cold seek delay value is used instead of the VCM seek delay value.

Figure 7:
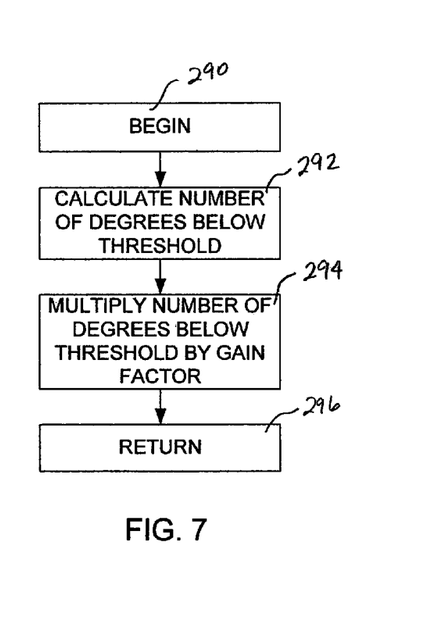
FIG. 7 is a flow chart depicting an example cold seek delay value calculation routine that may be used by the example cold governor seek processes depicted in FIGS. 4, 5, and 6.

Referring now to FIG. 7, depicted therein is one example of a process or routine that may be performed when the cold seek value is computed at steps 244 and 274 as described above. In this example, the process begins at a step 290 and proceeds to a step 292 where a difference value is calculated as the difference between the drive temperature and the threshold temperature. This difference value is then multiplied by a gain factor at step 294 to obtain the cold seek value. The process then proceeds to step 296, at which point the process or routine returns to the main cold seek governor process.

In the hard disk drive system 110 and seek governor processes described above, the drive temperature may be detected in many different ways. In the example hard disk drive system 110, the temperature sensor 192 takes the form of a thermistor mounted on the printed circuit board assembly (PCBA) incorporating the electronics 130.

However, many modern hard disk drive systems already incorporate temperature sensors for other purposes, such as the temperature sensor used by a seek governor to prevent the VCM from failing at high temperatures. The temperature sensor 192 may thus take the form of one or more readings from these existing temperature sensors. As one example, the temperature sensor 192 may be formed by a temperature sensor in close proximity to components with the greatest sensitivity to cold temperature power dissipation problems.

As another example, the temperature sensor 192 may take the form of a thermal model similar to those implemented for functions such as fly height monitoring and adjustment. Such models can use a combination of calibration readings, element relationship algorithms, and/or real-time data to generate temperature values representative of drive temperature for the purpose of limiting, under cold temperature conditions, power consumption by drive components such as the spindle motor 14, VCM 28, and/or the printed circuit board assembly on which the drive electronics 130 are mounted.

In the system 110 and cold seek governor processes described above, the cold seek parameters may be embodied in many different forms based on the characteristics of the specific hard disk drive system in which the cold seek governor is incorporated and/or the conditions under which the hard disk drive is intended to operate. As one example, the cold seek parameters may alter the servo compensator 156 to enforce a minimum time between seek operations. In the context of seek operations, such a delay may be implemented as a hesitation prior to performing the seek operation based on a delay value. Alternatively, necessary power reduction needed when operating at cold temperatures may be obtained by slowing the acceleration and deceleration of the normal seek profile.

The cold seek parameters may also be embodied as different cold seek parameter profiles that are selected based on a difference between the drive temperature and the threshold temperature. Again in the context of a seek delay, these profiles may increase the delay and/or select a different acceleration curve based on the magnitude of the difference between the drive temperature and the threshold temperature.

In the foregoing example processes depicted in FIGS. 4, 5, and 6, the term "greater than" is used at several decision points. This term can be used in the mathematical sense of a comparison of two values when the cold seek parameters are embodied as or relate to a delay value. In other situations, the cold seek parameters may not be a simple scalar value, but are instead a curve, profile, or combination of values. In these cases, the term "greater than" refers to a comparison of the "aggressiveness" of the function of one or more power consuming components of the hard disk drive. In the case of a seek operation, a less "aggressive" operation would be one that consumes less power, whether this reduction in power consumption is related to a simple delay time or to a more complex seek profile.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

I claim:

1. A cold seek governor process for a hard disk drive, comprising the steps of:
    sensing a drive temperature associated with the hard disk drive; and
    delaying between seek operations when the drive temperature is below a threshold temperature.

2. A process as recited in claim 1, wherein delaying between seek operations comprises limiting a minimum time allowed between seek operations to at least a defined cold seek delay time in response to sensing that the drive temperature is below the threshold temperature.

3. A process as recited in claim 2, wherein limiting a minimum time allowed between seek operations comprises regulating a servo compensator to cause at least the cold seek delay time to occur between completion of one seek operation and start of a subsequent seek operation by the servo compensator.

4. A process as recited in claim 1, wherein delaying between seek operations comprises increasing a minimum time between seek operations performed by the hard disk drive in response to sensing that the drive temperature is below the threshold temperature and decreasing the minimum time between seek operations in response to sensing that the drive temperature is above the threshold temperature.

5. A process as recited in claim 1, further comprising the step of disabling control of minimum delay between seek operations while the sensed drive temperature is above the threshold temperature and enabling control of minimum delay between seek operations while the sensed drive temperature is below the threshold temperature.

6. A process as recited in claim 2, further comprising the step of generating the cold seek delay time based on a difference between the temperature threshold and the drive temperature.

7. A process as recited in claim 1, in which the step of sensing the drive temperature comprises the step of measuring a temperature of at least one component of the hard disk.

8. A process as recited in claim 1, in which the step of sensing the drive temperature comprises the step of generating a thermal model based on at least one operation condition of the hard disk drive.

9. A controller for a hard disk drive, comprising:
a temperature sensor for sensing a drive temperature associated with the hard disk drive; and
a cold seek governor that regulates delay between seek operations when the drive temperature is below a threshold temperature.

10. A controller as recited in claim 9, in which the cold seek governor:
limits a minimum time allowed between seek operations to at least a defined cold seek delay time in response to sensing that the drive temperature is below the threshold temperature.

11. A controller as recited in claim 10, further comprising a servo compensator that carries-out seek operations, where the cold seek governor regulates the servo compensator to cause at least the cold seek delay time to occur between completion of one seek operation and start of a subsequent seek operation by the servo compensator.

12. A controller as recited in claim 10, wherein the cold seek governor increases a minimum time allowed between seek operations in response to sensing that the drive temperature is below the threshold temperature and decreases the minimum time between seek operations in response to sensing that the drive temperature is above the threshold temperature.

13. A controller as recited in claim 9, in which the cold seek governor is disabled from controlling minimum time between seek operations while the sensed drive temperature is above the threshold temperature and is enabled to control minimum delay between seek operations while the sensed drive temperature is below the threshold temperature.

14. A controller as recited in claim 10, in which the cold seek governor generates the cold seek delay time based on a difference between the temperature threshold and the drive temperature.

15. A controller as recited in claim 9, in which the temperature sensor measures a temperature of at least one component of the hard disk drive.

16. A controller as recited in claim 9, in which the temperature sensor generates a thermal model based on at least one operating condition of the hard disk drive.

17. A method comprising the steps of:
sensing a drive temperature associated with the hard disk drive; and
operating the hard disk drive in a power consumption reduction mode when the drive temperature is below the threshold temperature to reduce power consumption by the hard disk drive by limiting a minimum delay between seek operations to at least a cold seek delay time; and
operating the hard disk drive in a performance mode when the drive temperature is above the threshold temperature to improve performance of the hard disk drive by not limiting the minimum delay between seek operations to the cold seek delay time.

18. A method as recited in claim 17 where the step of operating the hard disk drive in the power consumption reduction mode comprises regulating a servo compensator to cause at least the cold seek delay time to occur between completion of one seek operation and start of a subsequent seek operation by the servo compensator.

19. A method as recited in claim 17, in which the step of operating the hard disk drive in the power consumption reduction mode comprises increasing the minimum time between seek operations and the step of operating the hard disk drive in the performance mode comprises decreasing the minimum time between seek operations.

20. A method as recited in claim 17, further comprising the step of disabling control of minimum delay between seek operations while the sensed drive temperature is above the threshold temperature and enabling control of minimum delay between seek operations while the sensed drive temperature is below the threshold temperature.

21. A method as recited in claim 17, further comprising the step of generating the cold seek delay time based on a difference between the temperature threshold and the drive temperature.

22. A method as recited in claim 17, in which the step of sensing the drive temperature comprises the step of measuring a temperature of at least one component of the hard disk drive.

23. A method as recited in claim 17, in which the step of sensing the drive temperature comprises the step of generating a thermal model based on at least one operating condition of the hard disk drive.

24. A hard disk drive, comprising:
a disk;
a transducer for writing data to and reading data from the disk;
a servo system that seeks the transducer between locations on the disk;
a temperature sensor for sensing a drive temperature associated with the hard disk drive; and
a cold seek governor that regulates the servo system to cause at least a cold seek delay time to occur between completion of one seek operation and start of a subsequent seek operation in response to the drive temperature being below a threshold temperature.

25. A hard disk drive as recited in claim 24, in which the cold seek governor increases a minimum time between seek operations performed by the servo system in response to the drive temperature being below the threshold temperature and decreases the minimum time between seek operations in response to the drive temperature being above the threshold temperature.

26. A hard disk drive as recited in claim 24, in which the cold seek governor is disabled from regulating the minimum delay between seek operations while the drive temperature is above the threshold temperature and is enabled to regulate the minimum delay between seek operations while the sensed drive temperature is below the threshold temperature.

27. A hard disk drive as recited in claim 24, in which the cold seek governor generates the cold seek delay time based on a difference between the temperature threshold and the drive temperature.

28. A hard disk drive as recited in claim 24, in which the temperature sensor measures a temperature of at least one component of the hard disk drive.

29. A hard disk drive as recited in claim 24, in which the temperature sensor generates a thermal model based on at least one operating condition of the hard disk drive.

30. A cold seek governor process for a hard disk drive, comprising the steps of:
   determining a temperature curve;
   sensing a drive temperature associated with the hard disk drive; and
   delaying between seek operations when the drive temperature is below the temperature curve.

31. A process as recited in claim 30, wherein delaying between seek operations comprises limiting a minimum time allowed between seek operations to at least a defined cold seek delay time in response to sensing that the drive temperature is below the temperature curve.

32. A process as recited in claim 31, wherein limiting a minimum time allowed between seek operations comprises regulating a servo compensator to cause at least the cold seek delay time to occur between completion of one seek operation and start of a subsequent seek operation by the servo compensator.

33. A process as recited in claim 30, wherein delaying between seek operations comprises increasing a minimum time between seek operations performed by the hard disk drive in response to sensing that the drive temperature is below the temperature curve and decreasing the minimum time between seek operations in response to sensing that the drive temperature is above the temperature curve.

34. A process as recited in claim 30, further comprising the step of disabling control of minimum delay between seek operations while the sensed drive temperature is above the temperature curve and enabling control of minimum delay between seek operations while the sensed drive temperature is below the temperature curve.

35. A process as recited in claim 31, further comprising the step of generating the cold seek delay time based on a difference between the temperature curve and the drive temperature.

36. A process as recited in claim 30, in which the step of sensing the drive temperature comprises the step of measuring a temperature of at least one component of the hard disk drive.

37. A process as recited in claim 30, in which the step of sensing the drive temperature comprises the step of generating a thermal model based on at least one operating condition of the hard disk drive.

* * * * *